United States Patent [19]

Trent et al.

[11] Patent Number: 5,961,620
[45] Date of Patent: Oct. 5, 1999

[54] EXTENSIBLE COMMUNICATION TYPE MANAGER FOR A COMPUTER SYSTEM

[75] Inventors: Adam Trent, Aloha; Peter J. Kaufman, Banks; Puneet Kukkal, Hillsboro, all of Oreg.

[73] Assignee: Intel Corporation, Santa Clara, Calif.

[21] Appl. No.: 08/831,766

[22] Filed: Apr. 1, 1997

Related U.S. Application Data

[63] Continuation of application No. 08/452,240, May 26, 1995, abandoned.

[51] Int. Cl.$^6$ .................................................... G06F 13/00
[52] U.S. Cl. ......................... 710/105; 709/245; 709/302; 709/303
[58] Field of Search .................................. 709/245, 302, 709/303; 710/100, 105

[56] References Cited

U.S. PATENT DOCUMENTS

| | | | |
|---|---|---|---|
| 5,388,213 | 2/1995 | Oppenheimer et al. | 395/200 |
| 5,440,558 | 8/1995 | Ban | 395/200.1 |
| 5,463,735 | 10/1995 | Pascucci et al. | 395/200.1 |
| 5,548,726 | 8/1996 | Pettus | 395/200.9 |

*Primary Examiner*—Ayaz R. Sheikh
*Assistant Examiner*—David A. Wiley
*Attorney, Agent, or Firm*—William H. Murray; N. Stephan Kinsella

[57] ABSTRACT

A general type manager for managing connection addresses and connection types of a computer system, wherein the general type manager provides a first interface for interfacing between the general type manager and one or more application programs of the computer system, and the general type manager is adapted to perform a plurality of general type manager (gtm) functions called by the application programs. The general type manager also provides a second interface for interfacing between the general type manager and one or more type managers of the computer system, wherein a type manager supports at least one connection type, and each type manager is adapted to perform a plurality of type functions called by the general type manager in accordance with one or more gtm functions called by an application program. The plurality of gtm functions comprises a first gtm function for initializing the general type manager for use; a second gtm function for preparing the general type manager to be unloaded; a third gtm function for editing a connection address in accordance with a connection type of the connection address; and a fourth gtm function for creating and editing a new connection address of a connection type supported by the one or more type managers.

20 Claims, 6 Drawing Sheets

GENERAL TYPE MANAGER ARCHITECTURE

Edit Phone Connection

Adam Trent

Area/City Code: 503
Local Number: 555-4431
Extension:

Country Code: United States | 1

Dialing Destination: (Unknown)
Dialed As: 5035554431

[OK] [Cancel] [Uses] [Help]

EXTENSIBLE COMMUNICATION TYPE MANAGER FOR A COMPUTER SYSTEM

This is a continuation of application Ser. No. 08/452,240 filed on May 26, 1995, now abandoned.

BACKGROUND OF THE INVENTION

1. Field of the Invention

The present invention relates to computer systems and methods and, in particular, to computer-implemented processes and apparatuses for extensible communications between applications and users of computer systems.

2. Description of the Related Art

It is desirable to provide for communication between and among various applications, components, and users of computer systems. In computer-based conferencing systems, for example, there is a need to provide for communication between remote users of applications of the conferencing system.

Such computer systems often comprise personal computer (PC) based systems operating in windowed environments such as those provided by versions of Microsoft® Windows™ operating system. Applications and elements of computer systems are associated with addresses of various types, which are often updated or created over time.

Remote communication is often enabled by a variety of hardware mechanisms. For example, such communication hardware mechanisms may include a data modem that enables data communications via a telephone POTS (Plain Old Telephone System) line, and a communication network interface that enables transfer of electronic mail (e-mail) messages over a local area network (LAN). Such a computer system may also include a high speed communication line interface that enables real time video communication for a video conferencing system.

In addition, such computer systems typically implement a variety of communication application programs that employ such hardware communication mechanisms. For example, a fax or fax-modem application program is typically implemented that performs fax and data communication via the hardware data modem. Such a prior computer system may also include an electronic mail application program that enables the transfer of e-mail messages and files over the LAN through the hardware network interface. In addition, such a computer system may implement a video conferencing application program that performs video data and other data transfer through the high speed communication line interface.

Such communication application programs typically require a user to specify one or more destination identifiers for transfer of communication data or messages. A fax application program typically requires the user to specify a telephone/fax number for a fax transmission. Similarly, a typical e-mail application program requires a user to specify an e-mail address for outbound messages. In addition, a typical video conferencing application requires a user to specify a destination address on the high speed communication line for transmission of outbound video data. For example, such a video conferencing application program may require the user to specify an integrated services data network (ISDN) address for video conferencing over an ISDN communication link.

Prior communication application programs typically implement an address book service that enables the user to store recipient names and corresponding destination information in an address book database. Typically, such an address book service maps recipient names into destination identifiers such as telephone numbers and e-mail addresses. In addition, such an address book service of a communication application program usually enables the user to search an address book database for a recipient name or destination name and retrieve the corresponding destination identifiers. For example, an address book service in a typical fax application program enables the user to store and retrieve fax numbers and associated recipient or destination names. A typical e-mail application program enables the user to store and retrieve e-mail LAN addresses associated with recipient names.

In some prior computer systems, each communication application program installed maintains a separate private address book. For example, a fax application program usually maintains a fax number address book while an e-mail application program maintains a separate e-mail address book.

Unfortunately, such separate address books typically require the user to enter the same information in multiple address book databases. For example, a particular recipient may have both a fax destination and an e-mail destination. In such prior systems, the user must typically enter the recipient name and associated information in the private address book for the fax application program as well as the private address book for the e-mail application program. Such a duplication of information among multiple private address books usually increases the amount of computer system storage space required by databases for communication application programs.

Moreover, such systems that require multiple private address books are usually difficult to maintain because changes to recipient information typically requires that the user change the same information in multiple address book databases. In addition, such systems typically require a user to learn several address book user interfaces. As a consequence, such systems typically occupy increased system resources and require increased maintenance for similar information maintained by multiple communication application programs.

Thus, there is a need to provide shared address book services for type management in a computer system. In computer systems such as conferencing systems, there are a variety of different address types, for example PHONE-ISDN and PHONE-POTS, or other types as referenced above. Each specific address type is supported by a Dynamic Link Library (DLL), such as a Windows DLL. For example, when a user of an application desires to connect to a second user of another conferencing node via an ISDN connection, a specific ISDN address is supplied. A dedicated ISDN-Type DLL then supports the connection to the second user at the second user's address over an ISDN. A type DLL manager or type library manager may be utilized to select the correct type DLL to support the relevant communication connection. For example, a video conferencing application program may incorporate a type library manager and several alternative type libraries or DLLs to support a variety of connection address types.

However, the set of different address types evolves over time, with old address types being updated and new address types being developed, for example to support new communications mechanisms or addressing schemes. A problem in the prior art is that such new address types cannot be added to existing application programs and their type management systems. A new application program and updated type management system must be developed, recompiled, and resold or otherwise redistributed to users in order to take advantage of new address types that are available.

What is needed, therefore, is an extensible communication type manager for a computer system which supports the formatting, storing, and user editing of new address types.

SUMMARY

There is provided herein a general type manager for managing connection addresses and connection types of a computer system, wherein the general type manager provides a first interface for interfacing between the general type manager and one or more application programs of the computer system, and the general type manager is adapted to perform a plurality of general type manager (gtm) functions called by the application programs. The general type manager also provides a second interface for interfacing between the general type manager and one or more type managers of the computer system, wherein a type manager supports at least one connection type, and each type manager is adapted to perform a plurality of type functions called by the general type manager in accordance with one or more gtm functions called by an application program. The plurality of gtm functions comprises a first gtm function for initializing the general type manager for use; a second gtm function for preparing the general type manager to be unloaded; a third gtm function for editing a connection address in accordance with a connection type of the connection address; and a fourth gtm function for creating and editing a new connection address of a connection type supported by the one or more type managers.

BRIEF DESCRIPTION OF THE DRAWINGS

These and other features, aspects, and advantages of the present invention will become more fully apparent from the following description, appended claims, and accompanying drawings in which:

FIG. 5 illustrates an edit dialog window for editing a phone connection address in accordance with user input entered in response to the cardedit dialog window of FIG. 4.

DESCRIPTION OF THE PREFERRED EMBODIMENT

Incorporation by Reference

A computer-based conferencing system and architecture therefor is disclosed in U.S. patent application Ser. No. 08/342,270, filed Nov. 16, 1994, which is a continuation-in-part of U.S. patent application Ser. No. 08/340,172, filed Nov. 15, 1994 now abandoned, which is a continuation-in-part of U.S. patent application Ser. No. 08/157,694, filed Nov. 24, 1993 now U.S. Pat. No. 5,506,954, all of which are incorporated herein in their entireties by reference. A system related to the address book technology referred to herein is disclosed in U.S. patent application Ser. No. 08/312,317, filed Sep. 26, 1994 now abandoned, the entirety of which also is incorporated herein by reference.

Shared Address Book Services

Figure 1:
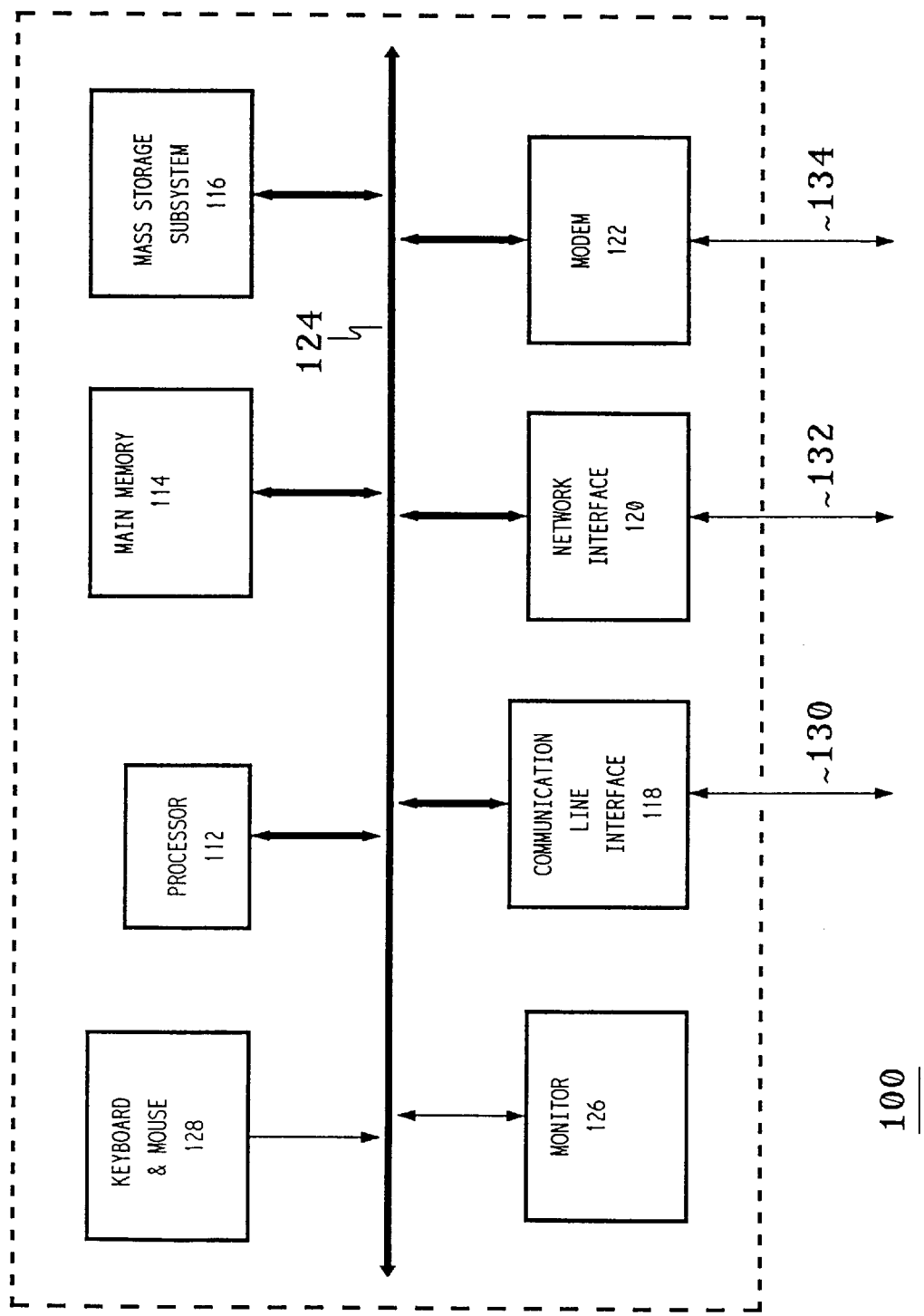
FIG. 1 illustrates a computer system for one embodiment which comprises a processor, a main memory, a mass storage subsystem, a communication line interface, a network interface, and a modem.

Referring now to FIG. 1, there is illustrated a computer system 100 in accordance with a preferred embodiment of the present invention. Computer system 100 comprises a processor 112, a main memory 114, and a mass storage subsystem 116. Computer system 100 further comprises a communication line interface 118, a network interface 120, and a modem 122. Processor 112, main memory 114, mass storage subsystem 116, communication line interface 118, network interface 120 and modem 122 are coupled for communication over a system bus 124.

System bus 124 may be any suitable digital signal transfer device, for example, an Industry Standard Architecture (ISA) bus or Extended ISA (EISA) bus. Processor 112 may be a general-purpose processor suitable for processing of conferencing data signals, such as Intel® general purpose microprocessors such as the Intel i386™, i486™, or Pentium™ processors. Those skilled in the art will appreciate that processor 112 may also be a special-purpose video processor such as the Intel 82750PB.

Main memory 114 provides storage areas for an operating system, a set of application programs including communication application programs and corresponding device driver programs and associated data structures for computer system 100. Mass storage subsystem 116 provides large scale data and program storage for computer system 100. Mass storage subsystem 116 may be any suitable means for storing digital signals and is preferably a combination of computer hard drive and random access memory (RAM) devices. Mass storage subsystem 116 provides storage areas for application programs, device driver programs, an operating system as well as databases and associated data structures for computer system 100.

Communications line interface 118 enables communication over a high speed communication link 130. In one embodiment, high speed communication link 130 comprises an ISDN communication link. Network interface 120 enables LAN communication via a communication link 132. In one embodiment, communication link 132 comprises an ethernet communication link. Modem 122 enables data communications and fax communications over a POTS telephone line 134.

Computer system 100 further comprises a keyboard and mouse 128 and a monitor 126. Keyboard and mouse 128 and monitor 126 enable the application programs executing on computer system 100 to perform user interface functions via input through keyboard and mouse 128 and output display on monitor 126. Monitor 126 may be any means for displaying analog image signals, for example, a VGA monitor.

Figure 2:
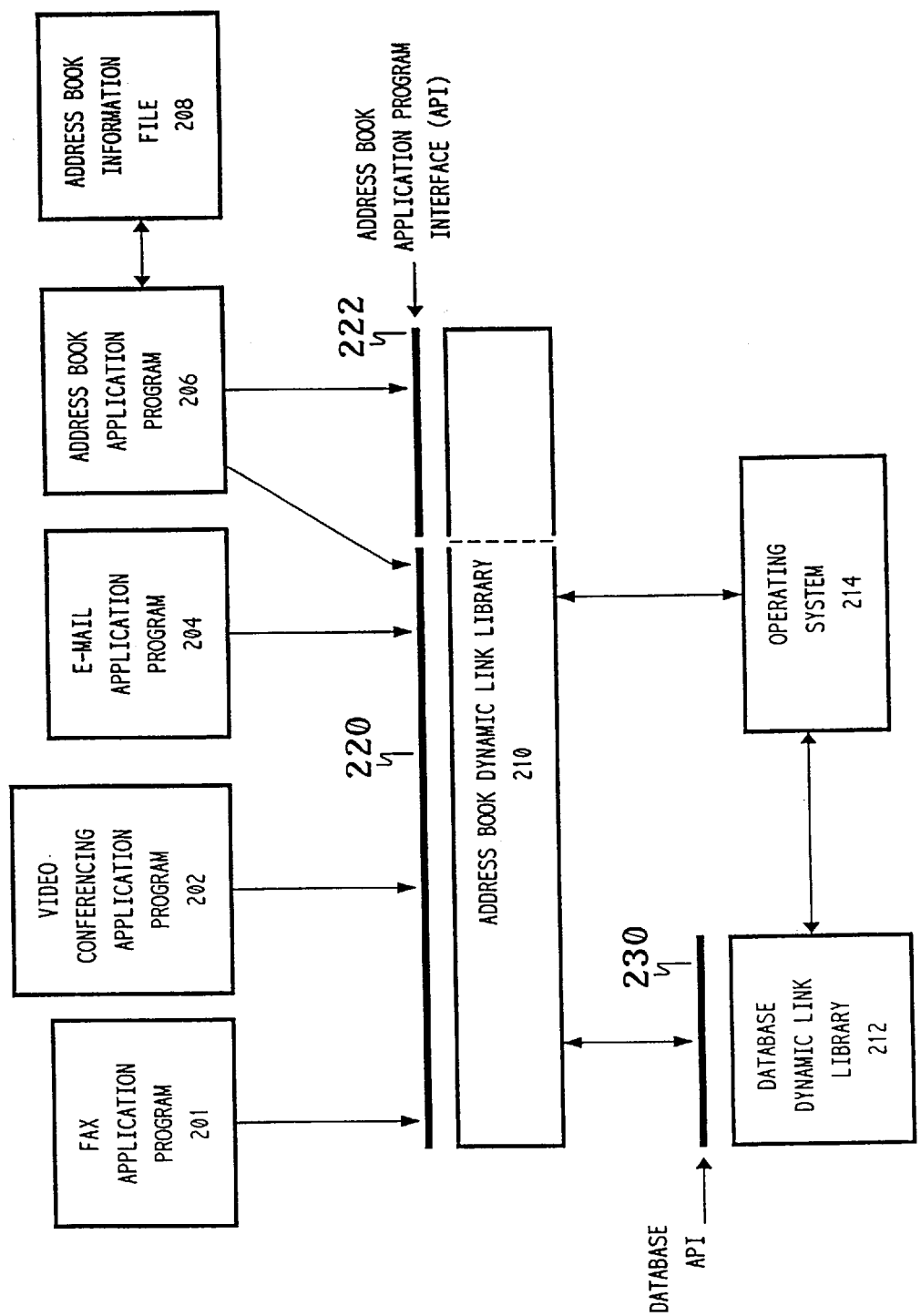
FIG. 2 illustrates exemplary software elements that may be implemented on the computer system of FIG. 1 which comprise a fax application program, a video conferencing application program, an e-mail application program, an address book application program, and an address book dynamic link library.

Referring now to FIG. 2, there is illustrated various exemplary software elements that may be implemented on computer system 100. The software elements of computer system 100 comprise a set of communication application programs including a fax application program 201, a video conferencing application program 202, and an e-mail application program 204. The software elements of computer system 100 further comprise an address book application program 206 and an address book DLL 210. The software elements of computer system 100 also include an operating system 214. In a preferred embodiment, operating system 214 is a Microsoft Windows operating system that provides communication interfaces between software elements via DLLs and corresponding application programmers interfaces (APIs). As further described below with reference to FIG. 3, a extensible, general type manager is also utilized in computer system 100 to support the formatting, storing, and user editing of address types. The implementation of software elements in FIG. 2 is discussed as implemented without such a general type manager, however, to illustrate the usage of APIs and an address book application program.

Address book DLL 210 provides address book services to application programs executing on computer system 100, including fax application program 201, video conferencing application program 202, and e-mail application program 204. Fax application program 201, video conferencing application program 202, and email application program 204 each access the address book services of address book DLL 210 through an address book API 220. Address book application program 206 also accesses the address book services of address book DLL 210 through address book API 220. Fax application program 201, video conferencing application program 202, and email application program 204, and other application programs are referred to as client communication application programs to address book DLL 210.

Fax application program 201 performs fax transfers over telephone line 134 via modem 122. Fax application program 201 performs dialing and fax handshake functions as well as telephone line hangup functions through modem 122. Fax application program 201 also implements user interface functions that enable a user to initiate fax transfers and to enter address book information for fax communication. The user interface functions of fax application program 201 also provide status displays to the user through monitor 126.

Video conferencing application program 202 performs real time video data transfers over high speed communication link 130 through communication line interface 118. Video conferencing application program 202 performs video data encoding and decoding functions as well as user interface functions. The user interface functions of video conferencing application program 202 enable a user to enter address book information including ISDN addresses that specify video conferencing recipients on communication link 130. The user interface functions of video conferencing application program 202 include video window displays and status displays on monitor 126.

Address book DLL 210 implements routines or functions for accessing and maintaining an address book database on mass storage subsystem 116. Address book DLL 210 accesses an address book database on mass storage subsystem 116 by invoking functions of database DLL 212. The functions of database DLL 212 are invoked through a database API 230.

Address book application program 206 implements user interface functions that enable a user to select individual destination identifiers from the address book database on mass storage subsystem 116. Address book application program 206 notifies the appropriate communication application program according to the type of destination identifier selected by the user. The user interface functions of the address book application program 206 also enable a user to enter, edit, and search address book information into the address book database in mass storage subsystem 116. As discussed in subsequent sections of this application, address book application program 206 includes a general type manager (GTM) which allows the addition of further address types to address book application program 206.

Fax application program 201, video conferencing application program 202, and e-mail application program 204 and any other client communication programs each invoke the address book services of address book DLL 210 through address book API 220. Address book API 220 enables the client communication application programs to access and update individual records in the address book database on mass storage subsystem 116. In addition, address book application program 206 accesses and updates individual records in the address book database on mass storage subsystem 116 through address book API 220.

Fax application program 201, video conferencing application program 202, and email application program 204, as well as any other client communication programs each invoke a register function of address book DLL 210 to register a corresponding callback function. The callback functions enable address book DLL 210 to notify the appropriate client communication application program of user selection or dialing events entered in address book application program 206.

Address book DLL 210 implements dial notification routines or functions that invoke the appropriate callback functions of the client communication application programs. Address book application program 206 invokes the dial notification functions through address book notification API 222 to notify the appropriate client communication application program upon user selection or dialing of a destination identifier in the address book.

For example, fax application program 201 registers a fax callback function with address book DLL 210 by invoking the register function of address book DLL 210 during application program startup. Thereafter, if the user selects or dials a fax destination identifier (i.e., fax number) through the user interface function of address book application program 206, then address book application program 206 invokes the dial notification function of address book DLL 210. Dial notification function in address book DLL 210 then invokes the fax callback function in fax application program 201 and provides the selected or dialed destination identifier from the address book database.

Address book application program 206 maintains an address book information file 208, which contains a default list of default client communication application programs. The default list specifies a default client communication application program for each of a predetermined set of communication types. For example, predetermined communication types may include fax, video, voice, or e-mail communication types.

For example, address book information file 208 specifies fax application program 201 as the default client communication application for the fax communication type. Address book information file 208 specifies video conferencing application 202 as the default client communication application program for the video communication type. Address book information file 208 specifies e-mail application program 204 as the default client communication application for the email communication type.

As described in further detail below, the predetermined set of communication types may be expanded through use of the extensible features of the general type manager of the present invention.

General Type Management

Figure 3:
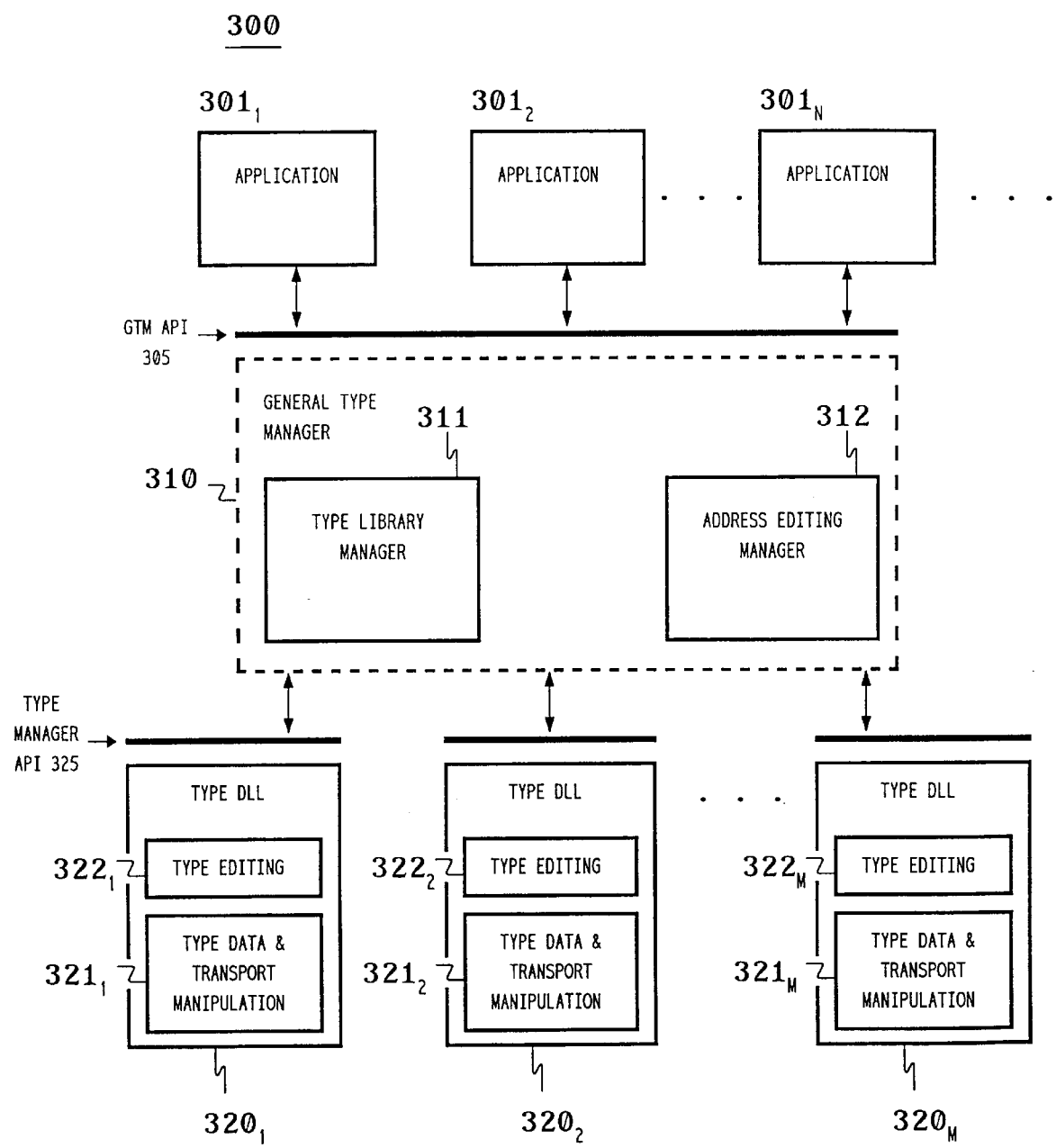
FIG. 3. is a block diagram of a preferred general type management architecture in accordance with the present invention.

Referring now to FIG. 3, there is shown a block diagram of a preferred general type management architecture 300 implemented on computer system 100 of FIG. 1 in accordance with the present invention. As illustrated in FIG. 3, there are two tiers of Application Programming Interface (API) for the General Type Manager (GTM) 310: GTM API 305 and Type Manager API 325. GTM API 305 is used by Windows applications $301_i$ that want to exploit the GTM subsystem 310 to manage connection address types, and may be embodied within an address book application program such as address book application program 206 described above with reference to FIG. 2. The purpose of this extensible architecture is to support an open-ended series of added type DLLs $320_i$, where each type DLL $320_i$ supports a specific connection address type (eg, LAN-IPX, LAN-TCP/IP, PHONE-ISDN, PHONE-POTS, PHONE-ATT/WORLDWORX, etc). These address types each serve conferencing and other communications over a given communications transport. As will be appreciated, when a new connection address type is developed or becomes available that is not among the set of address types supported by the existing set of type DLLs supported by GTM 310, a new type DLL needs to be supported by GTM so that this new connection address type may be available to application programs $301_i$. There may at any point in time be, in general, N applications $301_i$ and M type DLLs $320_i$. The number of applications $301_i$ and type DLLs $320_i$ may be increased by adding applications or type DLLs to the extendible GTM 310 architecture as described in further detail hereinbelow.

To facilitate the easy addition of new address type support, a standardized type manager API 325 is defined. As will be understood, GTM 310 is itself a DLL that is accessed by applications $301_i$ via GTM API 305. Any new type DLL $320_i$ that provides the type manager API 325 and is physically in the directory of GTM 310 can be found and added to the dynamic family of such type DLLs that applications $301_i$ may access. Each type DLL $320_i$ thus serves as a type manager which supports a connection address type. Type library manager subsystem 311 of GTM 310 handles this finding and tracking of such type DLLs. Once such type DLLs are identified and loaded, type library manager 311 can then dispatch an application's requests for services to appropriate type DLL $320_i$. The application makes such service requests using GTM API 305.

An important subset of such services allows the end user to edit connection addresses in ways that are unique to the address type. Type library manager 311 dispatches such edit service requests via an address editing manager subsystem 312. This subsystem works with specific type DLLs to load the appropriate dialog templates (as resources) from the specific type DLL's library file.

For example, type DLL $320_2$ may represent fax number address types. If the end user of application $301_1$ requests to change a type DLL $320_2$ connection address in a directory database, application $301_1$ makes the appropriate GTM API call (gtmEditAddress, as described in further detail below). Based on the connection type of the address, GTM 310 in turn dispatches this request to the appropriate type DLL's Type Editing subsystem (Type Editing $322_2$, in this case). Other subsets of GTM API 305 deal with creating, formatting, and converting various formats for connection addresses. These services are handled by the appropriate type data and transport manipulation subsystem $321_i$ of each type DLL $320_i$. This subsystem also provides services that discover whether the transport for each respective address type is "alive".

The routines and function calls of GTM API 305 and type manager API 325 which characterize general type manager 310 of the present invention are described in further detail below.

GTM API Routines

GTM 310 comprises an architecture that supports connection addresses in a unified way among a family of applications $301_i$. The architecture supports connection addresses with multiple uses (e.g. voice and video) over multiple physical transports (e.g., phone, netbios). GTM 310 supports this multi-way mapping in a manner that is extensible and yet offers consolidated common functionality allowing the applications to define and access this connection information.

GTM 310 may be used by, and thus part of, an address book application program such as address book application program 206 described above. GTM 310 provides those services required by address book application program 206 and other applications $301_i$, such as conferencing applications programs, for creating, editing, displaying, and establishing personal conferencing connections of different types in an extensible way. All or part of GTM 310 may become part of a conferencing management application or service layer in the future.

In previous address book application programs, type management was static with a fixed number of types and required recompilation of the address book application program each time a new address type was introduced. GTM 310 offers address book client applications $301_i$ the ability to introduce new connection types by creating new type DLLs that create, edit, and display connection addresses of those new types both from the address book application program as well as from the client application $301_1$ or conference manager, as well as launch applications to handle those types. Thus, as will be appreciated, type DLLs $320_{1-M}$ manage creating, editing, and formatting for display connection addresses of the given type.

Address book application program 206 and address book API 220 of FIG. 2 provide a common user interface, storage format, and means of accessing a database of connection addresses for all applications requiring address book services. GTM 310 extends this concept by separating usage-specific and transport-specific address operations from the address book application program 206 itself.

Applications that require address book services are referred to herein as "client applications". Examples of client applications are Intel ProShare™ Personal Conferencing applications such as ProShare Data Conferencing, ProShare Video Conferencing, and ProShare LAN Video Conferencing. GTM 310 also supports application types and address types defined by third party applications.

GTM and Address Book Client Applications

As discussed above, the routines and function calls of GTM API 305 and type manager API 325 characterize GTM 310. This section describes GTM API 305 routines and function calls.

Address book application program 206, herein referred to as ICOMMAB.EXE, is in a preferred embodiment a stand-alone Windows 3.1 application. As will be understood, it can be used to add/create/delete address book records, add/create/delete groups, view records by different criteria, and so on. GTM 310 represents part of address book API 220.

GTM 310 consists of type library manager 311, referred to herein as ICGTM.DLL, and address editing manager 312, as described above. As will be understood, GTM 310 may come supplied with a built-in number of type DLLS. Additionally, other client-supplied type DLL $320_i$ may be supported by GTM 310 as long as they comply with type manager API 325. In a preferred embodiment, the POTS Address DLL is ICHPONE.DLL and the LAN Address DLL is ICLAN.DLL. Address book application program 206, client applications 301$_i$, and GTM 310 may all make use of address book DLL 210 (ABDLL.DLL). As will further be understood, type library manager 311 may also contain some shared resources. For example, in a preferred embodiment, the ICGTM.DLL contains standard dialogs to allow the end-user to select a connection transport type or to select a connection usage. These standard ingredients are encountered by end-users when they are creating a new or editing an old connection type for a person entry in an address book.

A smart dialing DLL (not shown) may also be utilized, which translates POTS and ISDN numbers as they are stored in an address book into dialable numbers based on a location description. Further, database access DLL and file translation DLLs (not shown) may be used by address book application program 206 and ABDLL to store, import, and export address information.

Specific Services and Usage

What follows is a description of each of the services for type management that have been separated out from address book application program 206 for extensible type management support by GTM 310. Where appropriate, the user interface elements that are part of the client-supplied type DLLs 320$_i$ are described to aid in their creation.

Invocation

When address book application program 206 is launched, it loads the GTM DLL 310. It then calls the routine gtmInitialize (described below) to allow type library manager 311 to perform any initialization it requires. Before the application terminates, gtmTerminate (also described in further detail below) is called as well.

All routines that may be performed by type DLLs may be accessed via GTM API 305. This provides the ability to replace a given type DLL 320$_i$ in the future with a type DLL that allows client or connection management applications to "hook" the various routines or override the existing functionality in type library manager 311, allowing a form of type sub-classing.

There are two reasons for requiring that type DLLs 320$_i$ be installed by a client or user. First, users need not be presented with connection types for which they have no associated applications, reducing clutter, conserving hard disk space and avoiding confusion. Secondly, each client application 301$_i$ that ships an address book application program 206 need not burden its installation procedure or use up installation disk space with type DLLs that are of no concern to it or its customers.

A possible exception to this would be for a subset of the pre-defined types, e.g. those which are automatically incorporated into GTM 310. For example, from a user's point of view, it may be desirable to keep voice numbers and fax numbers in the address book files for convenience, even though the user may not have the associated voice or fax applications which use those type DLLs. At such time as users purchase those applications, those connection addresses (phone numbers) would automatically be useful by those applications. Furthermore, in this case, the user would not necessarily have to have kept that information in another address book or personal information manager (PIM) in order to keep them on line just because the user did not already have those other applications.

As each type DLL 320$_i$ is loaded, it is initialized by calling a routine called typeInitialize (described below). A type DLL 320$_i$ may use this routine to do any initialization that it requires that may not be convenient at the time LibMain is called. As will be appreciated by those skilled in the art, LibMain is a standard fixture of Windows DLLs that is called by Windows after the DLL is loaded.

Even though GTM 310 will call typeInitialize only once, and although all the type DLL 320$_i$ routines may be accessed through GTM 310, the particular type DLL 320$_i$ should be prepared to be used by several applications and it should be written so that typeInitialize could be called several times before it is unloaded. All modules that load these DLLs must unload them (these DLLs will not be IMPLIBed). (As will be understood by those skilled in the art, IMPLIBed is a standard Windows build process that forces an implicit load of a DLL at run-time, as opposed to explicitly loading a DLL, as GTM 310 does of type DLLs.) Similarly, all modules that call typeInitialize must call typeTerminate before unloading the type DLL so that they may clean up. Any one-time initialization and cleanup may be done in these routines as well by utilizing a counter.

Type Enumeration

The type library manager 311 does not enumerate the existing type DLLs 320$_{1-M}$. It "knows" about the built-in type DLLs that it supports. The gtmNewAddress function is called to allow the end-user to choose a physical connection transport type. This displays a dialog box with the available transport types and their possible uses. The caller passes a handle to a connection object and GTM 310 deposits the user's selection into that object.

Each type DLL 320$_i$ has a short string ($\leq$8 characters, in a preferred embodiment) that uniquely identifies the connection type handled by the type DLL and which is actually stored in the address book database (e.g., address book information file 208 of FIG. 2) with each connection address of that type. When the user selects a number in the address book to dial or edit, this type information will allow it to be determined, via GTM 310, which type DLL 320$_i$ to use to accomplish the operation.

Usage Enumeration

More than one application 301$_i$ may support a given use. For example, a telephony product such as a simple modem driven voice dialer (auto dialer), and another application, such as ProShare Video, both of which are capable of placing voice calls, each report the same usage. Storable usage type strings and the human readable usage type strings are both retrieved from GTM 310 itself.

GTM 310 "knows" about the various types and their possible uses. It has short ($\leq$8 character, in a preferred embodiment) use strings to be stored in the address book database in a NULL separated/double-NULL terminated form. GTM 310 maps these short use strings to human readable form that it keeps in its resource, before displaying. GTM 310 also provides a function called gtmGetUseDescription (described in further detail hereinbelow) to translate the short use strings that anyone could get from the database into human readable form.

In a preferred embodiment, to allow for extensibility, ICOMM.INI may have a new section called "Usage" which is read at initialization time and may thereafter be accessed through GTM 310 via gtmEnumUses and gtmGetUsageString. New uses need only be added to ICOMM.INI as they are installed.

Example

Figure 4:
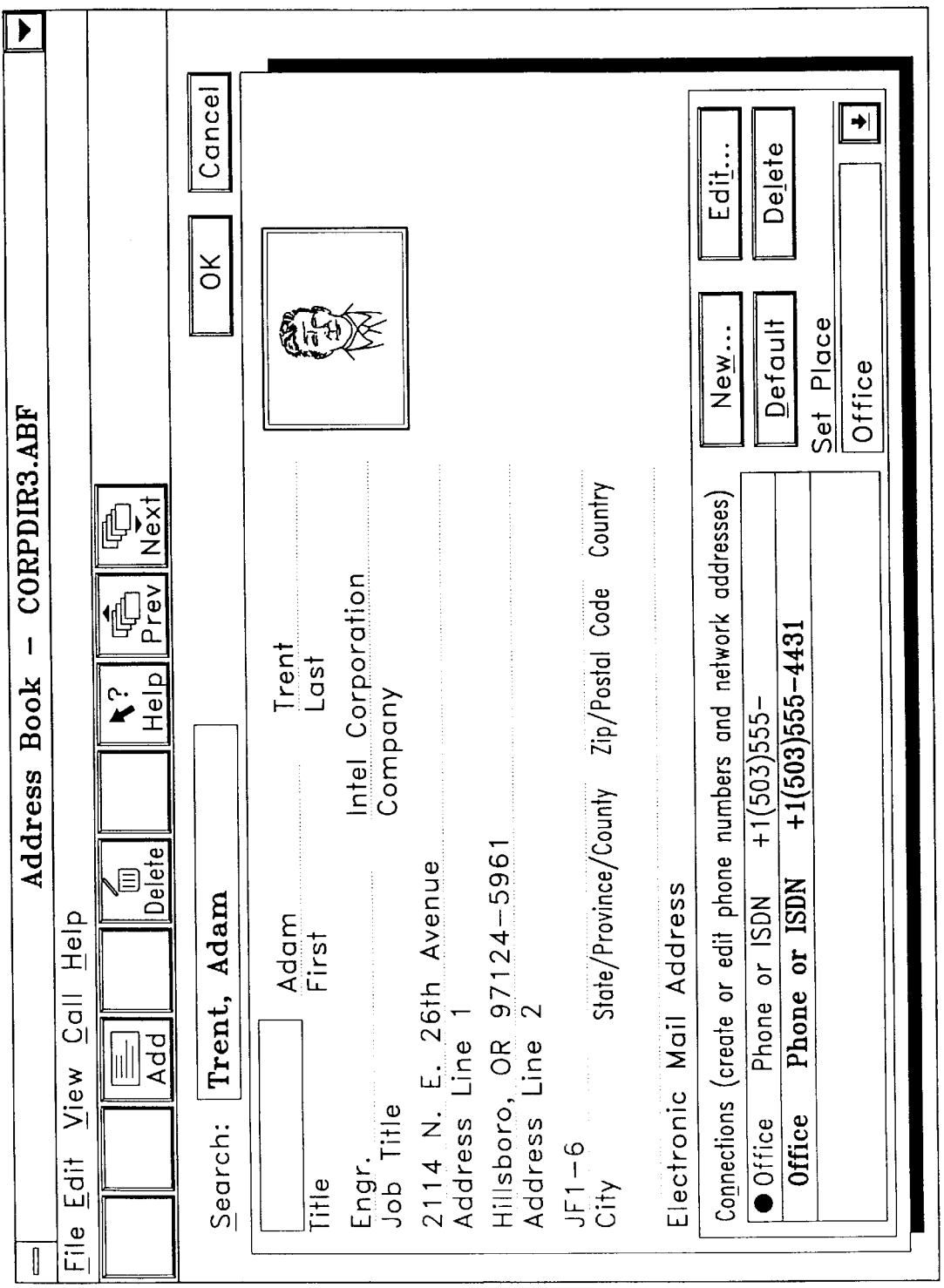
FIG. 4 illustrates a cardedit dialog window for editing connection addresses for a specific entry in an address database in accordance with the present invention.

Referring now to FIG. 4, there is illustrated a cardedit dialog window 400 for editing connection addresses for a specific entry in an address database in accordance with the present invention. Cardedit dialog window 400 may be displayed by an application, such as address book application program 206, which manages a name and address database, for example stored in address book information file 208 of FIG. 2. Cardedit dialog window 400 may be displayed by address book application program 206 to allow the user to edit a specific entry in the database, including connection addresses and their associated types for that entry, or to create new entries. As illustrated in FIG. 4, connections box 404 displays various connections in connections field 403 and choices such as new button 401 and edit button 402. When the desired connection in field 403 is highlighted, edit button 402 may be activated, as will be understood.

Creation of Connection Addresses

Figure 6:
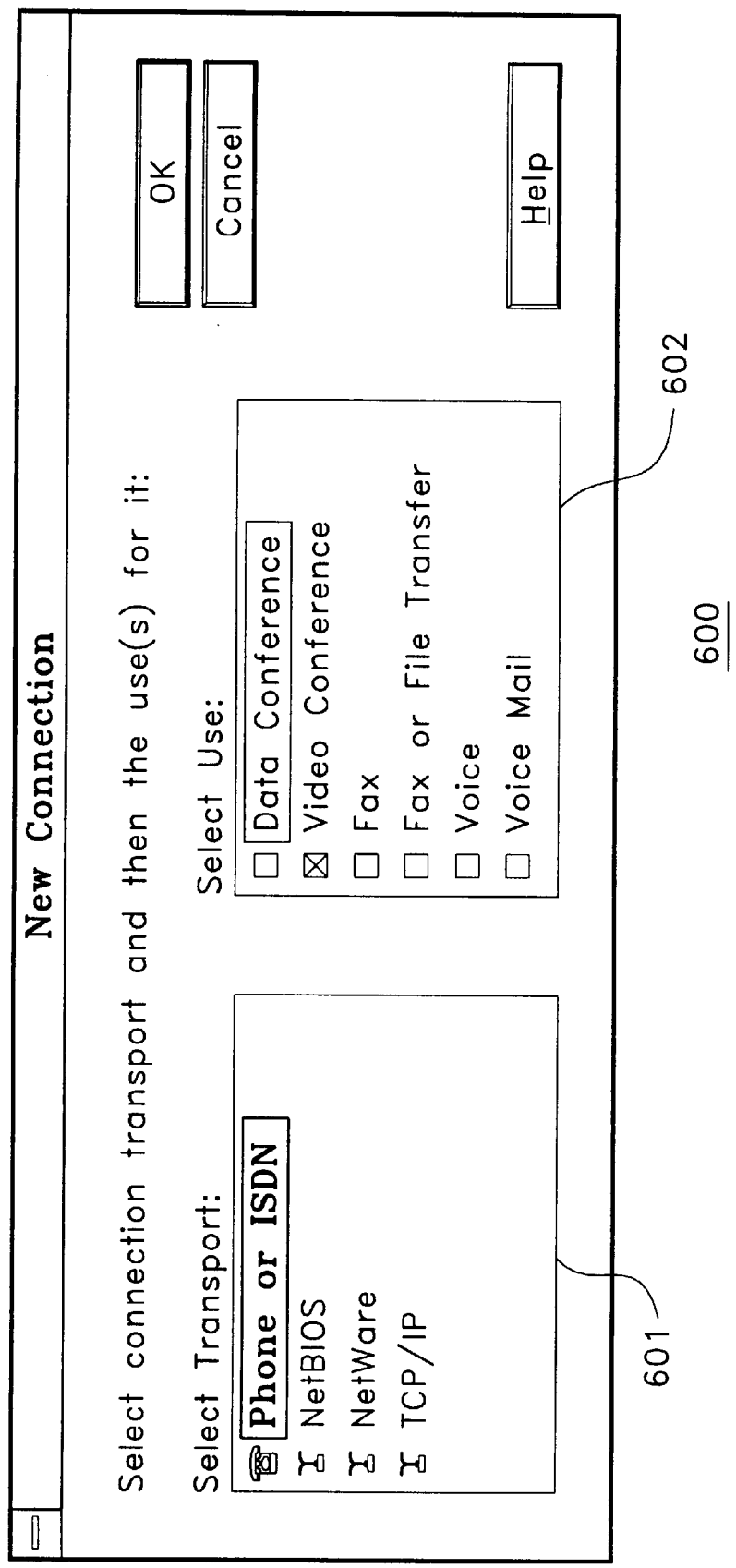
FIG. 6 illustrates a new dialog window for creating a new connection address in accordance with user input entered in response to the cardedit dialog window of FIG. 4.

Referring now to FIG. 6, there is illustrated a new dialog window 600 for creating a new connection address in accordance with user input entered in response to the cardedit dialog window of FIG. 4. In particular, when new button 401 of FIG. 4 is selected, the user may be presented by address book application program 206 with a dialog window such as new dialog window 600. List box 601 contains a list of various transport types which are available for the connection highlighted in connection field 403 of FIG. 4. Check box 602 contains a list of selected uses, at least some of which may be selected for a given transport selected in list box 601. As will be understood, each transport type of list box 601 is supported by a particular type DLL $320_i$. Additionally, when the user activates new button 401 of FIG. 4, address book application program 206 makes the GTM call gtmNewAddress, whereupon GTM 310 presents dialog window 600 which displays all the types and their possible uses, in boxes 601 and 602 of new dialog window 600. In this manner, the list of transports shown in list box 601 and the uses shown in check box 602 is determined dynamically.

Thus, from the Address Book, the user may create new connection addresses for individuals in their Address Book files. The type of the address to be created does not need to be supplied because, on a call to gtmNewAddress, as explained above, GTM 310 presents a dialog displaying all the types and their possible uses, where the user can make a choice. Once the choice is made, GTM 310 will in turn call the typeNewAddress for the user specified type, which creates a dialog with fields related to that type DLL. Upon closure of this dialog the type DLL assigns appropriate values in the connection object and GTM 310 passes it back to whichever user called gtmNewAddress. The caller has the responsibility to commit that connection to the address book database.

Optionally, the user may also supply label information to further distinguish that number from others for the same person. For example, most people have a phone number used for voice calls at work as well as another number at home, thus the labels "Office" and "Home" might both describe "Voice" usage type, "POTS" phone number type connections. This is not the responsibility of GTM 310 or the type DLL. Address book application program 206 handles this at a global level in its edit individual entry level.

Editing Existing Connection Addresses

Referring now to FIG. 5, there is illustrated an edit dialog window 500 for editing a phone type connection address in accordance with user input entered in response to the cardedit dialog window 400 of FIG. 4. In particular, when edit button 402 is selected, the user may be presented with a dialog window such as edit dialog window 500. As will be understood, fields of this entry may be edited by the user.

Thus, a user may choose to edit an existing connection address. By choosing to edit the information for an individual, the user may further select a connection address to modify. Address book application program 206 invokes connection address editing via the routine gtmEditAddress in type library manager 311.

The arguments to gtmEditAddress indicate which connection address is to be modified. gtmEditAddress does not prompt the user for the type of connection. Instead, it determines the type from the connection directly and uses this to call typeEditAddress in the appropriate connection type DLL $320_i$.

The type DLL accesses the specific values in the connection object as needed and presents this information in a dialog. After the user modifies the information and hits the OK button, only the connection object is modified; the connection is not committed to the database. If the user hits Cancel, the record is not modified, and typeEditAddress returns $ABRC_{13}$ CANCEL.

Editing dialogs validate all fields before storing in the connection object. If incomplete or incorrect information is provided and the user accepts the input (hits OK), the user is informed of the problem via a message box and is prevented from exiting the dialog (unless the user cancels the edit). User input focus (e.g., a blinking, vertical bar that indicates where user input is expected on the screen) is left in the errant field of the dialog to aid the user in locating the problem. If parsing of information in an edit control prevents closing the dialog, then the insertion point is left at the point the parsing failed and the rest of the field is selected (highlighted) so that typing with correct information will replace the errant information. This behavior is similar to other Windows applications and will aid the user in successfully completing the editing task.

The type DLLs $320_i$ may also provide other aids to the user to make completion of the edit task easier. For example, they may provide bindery or name server look up services, other database retrieval functions, "wizards," or validation, e.g. via pinging, to help ensure the information is accurate, current, and usable. In the case of phone number editing, the number is shown in a separate static field as it would be dialed from the current location with the current set of dialing rules, using a "Smart Dialing API," as will be understood. If the number is to be dialed as is, or if it is to be overridden when dialed, the ability to set those preferences is provided in the dialog as well.

Finally, as mentioned above under the heading "Creation of Connection Addresses," it may be useful to allow the user to specify/edit other valid uses for the connection address. For example, a given network address might be useful for both ProShare Data Conferencing as well as ProShare Video Conferencing. If the user knows that the individual for whom they are entering the address has both applications, then they may wish to only enter that information once at the time it is initially entered. Then, each address includes a list of all the "noted" uses of the given address. The dialogs provided by the connection type DLLs $320_i$ have a button to get to the "Select Uses" dialog (provided by GTM 310 through a call to gtmAssignUses (see description below)). This allows the user to change the uses for a specific connection during the editing process (for example when an existing individual in the address book who initially had Proshare Data installs Proshare Video, in which case the user would want to edit the individual's connection to have Video Conferencing in addition to Data Conferencing).

(Note that it may not be relevant whether the user has those applications, ignoring for the moment that they are not necessarily useful unless he or she does. The usage typing associated with connection addresses in address book application program 206 instead refers to the capabilities of the individual the user will be contacting via the address in the Address Book, that is the capabilities of the owner of the address, not the capabilities of the user entering the information. In alternative embodiments, if users are allowed to exchange electronic "business cards" using conferencing applications, then the user's system's capabilities would be important to that exchange. The presence of type DLLs $320_i$ serve to inform address book application program 206 and client applications $301_i$ themselves, as well as conference management applications, of local capabilities for inclusion in such electronic business cards.)

If the user enters and accepts the valid connection address information in the dialog, the $HAB_{13}$ CONNECTION structure is filled in from the user's edits in the dialog fields and a value of $ABRC_{13}$ SUCCESS is returned to GTM.
Display There are several pieces of information specific to an address that address book application program 206 displays when it presents address information to the user. These include the address's label ("Place"), the usage of that address (its type), and the address itself. An address list display in an application may allow a preference that replaces the usage type with the address type for certain purposes, e.g. showing the list from within an application where the usage may be assumed.

The label is merely a convenience to the user and neither address book application program 206 nor any other application places any semantic meaning, nor does it provide any validation other than length, on the contents of that field. The strings that are displayed for the address label are taken directly from the connection address structure. No special API is required in GTM 310 or in the client supplied type DLLs $320_i$.

The type is primarily indicative of the default usage of that address, that is, it implies which application should be invoked to handle a connection with that address. The fixed, pre-defined types from previous embodiments of address book application programs without GTM 310 also had fixed, pre-defined strings that were used to display those types. These pre-defined types also implied the type of physical medium for which that address was meaningful. For example, phone numbers of type Video not only implied that ProShare Video Conferencing would be used to "dial" an address with that type, it also implied that it was an ISDN address, rather than a POTS number.

GTM 310 distinguishes between usage (application type) and medium (connection type) . The pre-defined types remain pre-defined insofar with the manner that they are associated with applications of specific types on specific physical media, but when that type information is displayed, the distinction is enforced. New types, such as Video over the LAN, ISDN voice calls, and the like, are handled via the new GTM 310 architecture.

Strings representing connection types are returned to address book application program 206, its component DLLs, and other users of GTM 310 with the call gtmGetTypeDescription. The short ($\leq 8$ character) type strings that identify a connection type uniquely are passed to gtmGetTypeDescription as arguments. Calls to gtmGetTypeDescription invoke the routine typeGetString for each type supplied by each connection type DLL. Multiple calls may be made if a single type DLL $320_i$ supplies multiple types. These routines return their results in an argument buffer.

As described above, usage strings are returned from calls to gtmGetUseDescription in GTM 310 which returns them by looking at its resources.

Finally, the most important piece of address-specific information is the address itself. The various types of connection address information constitute more knowledge than address book application program 206 can hope to encapsulate. Therefore, not only does the editing of the address information fall on the client-supplied type DLLs $320_i$, but the task of producing displayable strings that represent that information in a human readable form for the user is also the responsibility of these type DLLs. The GTM routine gtmFormatAddress specifies a buffer to receive the displayable address string along with the $HAB_{13}$ CONNECTION. GTM 310 in turn dispatches this request to the appropriate connection type DLL's typeFormatAddress routine.
Functions The following section defines the address book-supplied GTM API 305. Subsequent sections describe the type manager API 325 of the client-supplied type DLLs $320_i$.
General Type Management API The routines listed below are available in type library manager 311 (ICGTM.DLL). Address book application program 206 statically links to GTM 310 and calls gtmInitialize during application initialization. Access to the client-supplied type DLLs $320_i$ is always accomplished via a call into GTM 310 using GTM API 305.

gtmInitialize

| | |
|---|---|
| Syntax | AB_RETCODE gtmInitialize( [i]uiSessionID ) Initializes GTM for use and calls typeInitialize in each type DLL. |
| Parameters | UINT    uiSessionID<br>The session ID returned by abRegister. |
| Return Value | Returns ABRC_SUCCESS (i.e., 0) if the function was successful. Otherwise, the return value is a non-zero value often determined by the specific error condition that arose in a Type Manager. |
| See Also | gtmTerminate, typeInitialize. | gtmTerminate

| | |
|---|---|
| Syntax | AB_RETCODE gtmTerminate( [i]uiSessionID ) Do any clean up and prepare GTM 310 to be unloaded. Calls typeTerminate for each type DLL, respectively. |
| Parameters | UINT    uiSessionID<br>The session ID returned by abRegister. |
| Return Value | Returns ABRC_SUCCESS (i.e., 0) if the function was successful. Otherwise, the return value is a non-zero. value often determined by the specific error condition that arose in a Type Manager. |

-continued

| | |
|---|---|
| See Also | gtmInitialize, typeTerminate. |
| gtmEditAddress | |
| Syntax | AB_RETCODE gtmEditAddress( [i]uiSessionID, [i]hwnd, [io]habConn )<br>Use this function to edit the connection address in the given HAB_CONNECTION. This routine calls the typeEditAddress function of the appropriate DLL based on the connection type of the given connection address. |
| Parameters | UINT    uiSessionID<br>        The session ID returned by abRegister.<br>HWND    hwnd<br>        Handle to window of calling client.<br>HAB_CONNECTION hAbConn<br>The connection to be edited. |
| Return Value | Returns ABRC_SUCCESS (i.e., 0) if the function was successful. Otherwise, the return value is a non-zero value often determined by the specific error condition that arose in a Type Manager. |
| See Also | gtmNewAddress, typeEditAddress |
| gtmFormatAddress | |
| Syntax | AB_RETCODE gtmFormatAddress( [i]uiSessionID, [i]hAbConn, [o]lpszBuffer, [i]uiLen)<br>Use this function to format (for display) the connection address in the given HAB_CONNECTION. This routine calls the typeFormatAddress (address edit) function of the appropriate type DLL based on the connection type of the given connection address. |
| Parameters | UINT    uiSessionID<br>        The session ID returned by abRegister.<br>HAB_CONNECTION hAbconn<br>        Connection structure that holds the address to be formatted.<br>LPSTR    lpszBuffer<br>        The buffer to receive the formatted address.<br>UINT    uiLen<br>        The length of the buffer. |
| Return Value | Returns ABRC_SUCCESS (i.e., 0) if the function was successful. Otherwise, the return value is a non-zero value often determined by the specific error condition that arose in a Type Manager. |
| See Also | TypeFormatAddress |
| gtmNewAddress | |
| Syntax | AB_RETCODE gtmNewAddress( [i]uiSessionID, [i]hwnd, [io]hAbConn )<br>Creates a dialog presenting all the existing connection types that GTM is aware of, in order to figure out the user's desire for a specific connection type or physical transport. typeEditAddress for the specified type is then called with the hAbConn to pass the given connection to the correct handling type DLL for data insertion. |
| Parameters | UINT    uiSessionID<br>        The session ID returned by abRegister.<br>HWND    hwnd<br>        Handle to window of calling client.<br>HAB_CONNECTION hAbConn<br>        Connection structure to which to add a connection address. |
| Return Value | Returns ABRC_SUCCESS (i.e., 0) if the function was successful. Otherwise, the return value is a non-zero value often determined by the specific error condition that arose in a Type Manager. |
| See Also | gtmEditAddress |
| gtmGetTypeDescription | |
| Syntax | AB_RETCODE gtmGetTypeDescription( [i]uiSessionID, [i]lpszTransport, [o]lpszBuffer, [i]uiLen )<br>Calls typeGetString to get a human readable text string corresponding to the transport string provided in lpszTransport. |

| | | -continued |
|---|---|---|
| Parameters | UINT | uiSessionID |
| | | The session ID returned by |
| | | abRegister. |
| | LPSTR | lpszTransport |
| | | A transport type such as Phone, |
| | | Netware, etc. that is stored in the |
| | | HAB_CONNECTION structure. |
| | LPSTR | lpszBuffer |
| | | The buffer to receive the human |
| | | readable name for the type. |
| | UINT | uiLen |
| | | The length of the buffer. |
| Return Value | | Returns ABRC_SUCCESS (i.e., 0) if the function was |
| | | successful. Otherwise, the return value is a non- |
| | | zero value often determined by the specific error |
| | | condition that arose in a Type Manager. |
| See Also | | typeGetString |
| gtmGetUseDescription | | |
| Syntax | | AB_RETCODE gtmGetUseDescription( [i]uiSessionID, |
| | | [i]lpszUse, [o]lpszBuffer, [i]uiLen ) |
| | | Translates the use string (that actually is stored |
| | | in the address book database) into a human readable |
| | | form. |
| Parameters | UINT | uiSessionID |
| | | The session ID returned by abRegister. |
| | LPSTR | lpszUse |
| | | A use string such as Video, etc. that is |
| | | stored in the address book database and |
| | | presented in the HAB_CONNECTION |
| | | structure. |
| | LPSTR | lpszBuffer |
| | | The buffer to receive the human readable |
| | | name for the use. |
| | UINT | uiLen |
| | | The length of the buffer. |
| Return Value | | Returns ABRC_SUCCESS (i.e., 0) if the function was |
| | | successful. Otherwise, the return value is a non- |
| | | zero value often determined by the specific error |
| | | condition that arose in a Type Manager. |
| gtmAssignUses | | |
| Syntax | | AB_RETCODE gtmAssignUses( [i]uiSessionID, [i]hwnd, |
| | | [i]hAbConn, [o]lpszBuffer, [i]uiLen ) |
| | | Checks the type of connection through hAbConn and |
| | | presents a USES dialog with uses that are possible |
| | | for that connection type. It does not update the |
| | | uses in the hAbconn, instead it returns the NULL |
| | | separated and double NULL terminated uses in the |
| | | buffer. |
| Parameters | UINT | uiSessionID |
| | | The session ID returned by |
| | | abRegister. |
| | HWND | hwnd |
| | | The window handle of the caller. |
| | HAB_CONNECTION hAbConn | |
| | | Connection structure that holds the |
| | | address for which the uses need to |
| | | be assigned. |
| | LPSTR | lpszBuffer |
| | | The buffer to receive the NULL |
| | | separated-double NULL terminated |
| | | uses. |
| | UINT | uiLen |
| | | The length of the buffer. |
| Return Value | | Returns ABRC_SUCCESS (i.e., 0) if the function was |
| | | successful. Otherwise, the return value is a non- |
| | | zero value often determined by the specific error |
| | | condition that arose in a Type Manager. |

Connection Type DLL API

The routines listed below are required in each connection type DLL $320_i$. "Connection" refers to the physical connection, for example a POTS connection, an ISDN connection, or a network connection via some transport, such as Netware or TCP/IP. Such connection type DLLs are placed in the Address Book directory on the user's mass storage subsystem 116 so that GTM 310 may find them by name and load them with the Windows load library API call. The names of the connection type DLLs should have a name of the form <name>.DLL, where <name> implies the type of transport and is unlikely to clash with the names of other modules that may be loaded in Windows at the same time, for example, ICISDN.DLL, ICPHONE.DLL, etc. The routines in these type DLLs are not meant to be called directly from an application $301_i$ if the application needs to be extensible to new connection types. Access to the routines in these type DLLs can be accomplished via a call into GTM 310 for which a static link library exists.

| typeInitialize | |
|---|---|
| Syntax | AB_RETCODE typeInitialize( [i]uiSessionID ) Initializes the type DLL for use. Called by gtmInitialize. |
| Parameters | UINT uiSessionID<br>The session ID returned by abRegister. |
| Return Value | Returns ABRC_SUCCESS (i.e., 0) if the function was successful. Otherwise, the return value is a non-zero value often determined by the specific error condition that arose in a Type Manager. |
| See Also | typeTerminate, gtmInitialize. |

| typeTerminate | |
|---|---|
| Syntax | void typeTerminate( [i]uiSessionID )<br>Do any clean up and prepare application type DLL to be unloaded. Called by gtmTerminate. |
| Parameters | UINT uiSessionID<br>The session ID returned by abRegister. |
| Return Value | None |
| See Also | typeInitialize, gtmTerminate. |

| typeEditAddress | |
|---|---|
| Syntax | AB_RETCODE typeEditAddress( [i]uiSessionID, [i]hwndParent, [io]habConn )<br>Use this function tc edit the connection address in the given HAB_CONNECTION. This routine is called by gtmEditAddress. |
| Parameters | UINT uiSessionID<br>The session ID returned by abRegister.<br>HWND hwndParent<br>Parent window for the edit dialog.<br>HAB_CONNECTION habConn<br>The connection to be edited. |
| Return Value | Returns ABRC_SUCCESS (i.e., 0) if the function was successful. Otherwise, the return value is a non-zero value often determined by the specific error condition that arose in a Type Manager. |
| See Also | gtmNewAddress, gtmEditAddress |

| typeNewAddress | |
|---|---|
| Syntax | AB_RETCODE typeNewAddress( [i]uiSessionID, [i]hwndParent, [io]habConn )<br>Use this function to create a new connection address in the given HAB_CONNECTION. This routine is called by gtmNewAddress. |
| Parameters | UINT uiSessionID<br>The session ID returned by abRegister.<br>HWND hwndParent<br>Parent window for the edit dialog.<br>HAB_CONNECTION habConn<br>The connection structure to be filled with new address. |
| Return Value | Returns ABRC_SUCCESS (i.e., 0) if the function was successful. Otherwise, the return value is a non-zero value often determined by the specific error condition that arose in a Type Manager. |
| See Also | gtmNewAddress, gtmEditAddress |

| typeFormatAddress | |
|---|---|
| Syntax | AB_RETCODE typeFormatAddress( [i]uiSessionID, [i]habConn, [o]lpszBuffer, [i]uiLen )<br>Use this function to format (for display) the specified connection address of the given HAB_REC. |
| Parameters | UINT uiSessionID<br>The session ID returned by abRegister.<br>HAB_CONNECTION habConn<br>The connection structure that holds the address.<br>LPSTR lpszBuffer<br>The buffer to receive the formatted address string.<br>UINT uiLen<br>The length of the buffer. |
| Return Value | Returns ABRC_SUCCESS (i.e., 0) if the function was successful. Otherwise, the return value is a non-zero value often determined by the specific error condition that arose in a Type Manager. |
| See Also | gtmFormatAddress |

| typeGetString | |
|---|---|
| Syntax | AB_RETCODE typeGetString( [i]uiSessionID, [i]lpszTransport, [o]lpszBuffer, [i]uiLen )<br>The type DLL checks to see if it is one of the transports that it handles. If it does then it returns a human readable form of the string in the buffer. |
| Parameters | UINT uiSessionID<br>The session ID returned by abRegister.<br>LPSTR lpszTransport<br>A transport type such as Phone, Netware, etc.<br>LPSTR lpszBuffer<br>The buffer to receive the human readable name for the type.<br>UINT uiLen<br>The length of the buffer. |
| Return Value | Returns ABRC_SUCCESS (i.e., 0) if the function was successful. Otherwise, the return value is a non-zero value often determined by the specific error condition that arose in a Type Manager. |
| See Also | gtmGetTypeDescription |

Example Type Manager API Implementation

Those skilled in the art will appreciate the manner of implementation of the above-described functions, DLLs, and API's. As an example, the following code describes an exemplary implementation of PhoneType DLL external header file used for the phone transport:

```
/*
 * Description : PhoneType DLL External header file
 */
#ifdef__cplusplus
extern "C" {
#endif
/* Function Declarations */
extern AB_RETCODE WINAPI_export
typeInitialize( UINT wSessionID );
extern void WINAPI_export
typeTerminate ( UINT wSessionID );
extern AB_RETCODE WINAPI_export
typeEditAddress( UINT wSessionID,
HWND hwndParent,
HAB_CONNECTION hAbConn );
extern AB_RETCODE WINAPI_export
typeNewAddress( UINT wSessionID,
HWND hwndparent,
HAB_CONNECTION hAbConn );
extern AB_RETCODE WINAPI_export
typeFormatAddress ( UINT wSessionID,
HAB_CONNECTION hAbConn,
LPSTR lpszBuffer,
UINT nLen );
AB_RETCODE WINAPI_export
typeGetString( UINT wSessionID,
LPCSTR lpcszType,
LPSTR lpszBuffer,
UINT nLen );
AB_RETCODE WINAPI_export
typeEnumTypes (
UINT wSessionID,
ENUMTYPESPROC lpfnEnumTypesProc,
LPARAM lParam );
#ifdef__cplusplus
}
#endif
```

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A general type manager for managing connection addresses and connection types of a computer system, wherein:

the general type manager provides a first interface for interfacing between the general type manager and one or more application programs of the computer system;

the general type manager is adapted to perform a plurality of general type manager (gtm) functions called by the application programs;

the general type manager provides a second interface for interfacing between the general type manager and one or more type managers of the computer system, wherein a type manager supports at least one connection type; and each type manager is adapted to perform a plurality of type functions called by the general type manager in accordance with one or more gtm functions called by an application program.

2. The general type manager of claim 1, wherein the plurality of gtm functions comprises:

a first gtm function for initializing the general type manager for use;

a second gtm function for preparing the general type manager to be unloaded;

a third gtm function for editing a connection address in accordance with a connection type of the connection address;

a fourth gtm function for creating and editing a new connection address of a connection type supported by the one or more type managers;

a fifth gtm function for formatting a connection address for display;

a sixth gtm function for providing a description of a connection type; and a seventh gtm function for providing a description of a use parameter associated with a given connection type.

3. The general type manager of claim 2, wherein the plurality of type functions comprises:

a first type function for initializing the type manager for use;

a second type function for preparing the type manager to be unloaded;

a third type function for editing a connection address in accordance with a connection type of the connection address;

a fourth type function for creating a new connection address;

a fifth type function for formatting a connection address for display; and a sixth type function for providing a description of the connection type of the type manager.

4. The general type manager of claim 3, wherein each connection type corresponds to a physical transport type.

5. The general type manager of claim 3, wherein the first and second interfaces are application programmers interfaces.

6. The general type manager of claim 3, wherein the general type manager is provided in an address book application program of the computer system.

7. The general type manager of claim 3, wherein:

the general type manager comprises:

a type library manager for managing the one or more type managers and for dispatching calls by the general type manager to the appropriate type manager; and an address editing manager for managing the editing of address types in accordance with the address type; and the one or more type managers and the general type manager are dynamic link libraries.

8. The general type manager of claim 3, wherein:

the first type function is a typeInitialize function;

the second type function is a typeTerminate function;

the third type function is a typeEditAddress function;

the fourth type function is a typeNewAddress function;

the fifth type function is a typeFormatAddress function; and the sixth type function is a typeGetString function.

9. The general type manager of claim 8, wherein:

calling the gtmInitialize function causes the general type manager to call the typeInitialize function of an appropriate type manager, wherein the appropriate type manager is determined in accordance with the connection type of a supplied connection address;

calling the gtmTerminate function causes the general type manager to call the typeTerminate function of the appropriate type manager;

calling the gtmEditAddress function causes the general type manager to call the typeEditAddress function of the appropriate type manager;

calling the gtmFormatAddress function causes the general type manager to call the typeFormatAddress function of the appropriate type manager;

calling the gtmNewAddress function causes the general type manager to: call the typeNewAddress function of the appropriate type manager, create a dialog window to display the existing connection types, and determine a specified connection type in response to a user's input; and calling the gtmGetTypeDescription function causes the general type manager to call the typeGetString function of the appropriate type manager to provide a human readable text string corresponding to the connection type.

10. The general type manager of claim 9, wherein:

the general type manager comprises:

a type library manager for managing the one or more type managers and for dispatching calls by the general type manager to the appropriate type manager; and an address editing manager for managing the editing of address types in accordance with the address type; and the one or more type managers and the general type manager are dynamic link libraries.

11. In a computer system, a general type manager for managing connection addresses and connection types of the computer system, the general type manager comprising:

a first interface for interfacing between the general type manager and one or more application programs of the computer system;

means for performing a plurality of gtm functions called by the application programs; and a second interface for interfacing between the general type manager and one or more type managers of the computer system, wherein:

each type manager supports at least one connection type; and each type manager is adapted to perform a plurality of type functions called by the general type manager in accordance with one or more gtm functions called by an application program.

12. The general type manager of claim 11, wherein the plurality of gtm functions comprises:

a first gtm function for initializing the general type manager for use;

a second gtm function for preparing the general type manager to be unloaded;

a third gtm function for editing a connection address in accordance with a connection type of the connection address;

a fourth gtm function for creating and editing a new connection address of a connection type supported by the one or more type managers;

a fifth gtm function for formatting a connection address for display;

a sixth gtm function for providing a description of a connection type; and a seventh gtm function for providing a description of a use parameter associated with a given connection type.

13. The general type manager of claim 12, wherein the plurality of type functions comprises:

a first type function for initializing the type manager for use;

a second type function for preparing the type manager to be unloaded;

a third type function for editing a connection address in accordance with a connection type of the connection address;

a fourth type function for creating a new connection address;

a fifth type function for formatting a connection address for display; and a sixth type function for providing a description of the connection type of the type manager.

14. The general type manager of claim 13, wherein each connection type corresponds to a physical transport type.

15. The general type manager of claim 13, wherein the first and second interfaces are application programmers interfaces.

16. The general type manager of claim 13, wherein the general type manager is provided in an address book application program of the computer system.

17. The general type manager of claim 13, further comprising:

a type library manager for managing the one or more type managers and for dispatching calls by the general type manager to the appropriate type manager; and an address editing manager for managing the editing of address types in accordance with the address type, wherein the one or more type managers and the general type manager are dynamic link libraries.

18. The general type manager of claim 13, wherein:

the first type function is a typeInitialize function;

the second type function is a typeTerminate function;

the third type function is a typeEditAddress function;

the fourth type function is a typeNewAddress function;

the fifth type function is a typeFormatAddress function; and the sixth type function is a typeGetString function.

19. The general type manager of claim 18, wherein:

calling the gtmInitialize function causes the general type manager to call the typeInitialize function of an appropriate type manager, wherein the appropriate type manager is determined in accordance with the connection type of a supplied connection address;

calling the gtmTerminate function causes the general type manager to call the typeTerminate function of the appropriate type manager;

calling the gtmEditAddress function causes the general type manager to call the typeEditAddress function of the appropriate type manager;

calling the gtmFormatAddress function causes the general type manager to call the typeFormatAddress function of the appropriate type manager;

calling the gtmNewAddress function causes the general type manager to: call the typeNewAddress function of the appropriate type manager, create a dialog window to display the existing connection types, and determine a specified connection type in response to a user's input; and calling the gtmGetTypeDescription function causes the general type manager to call the typeGetString function of the appropriate type manager to provide a human readable text string corresponding to the connection type.

20. The general type manager of claim 19, further comprising:

a type library manager for managing the one or more type managers and for dispatching calls by the general type manager to the appropriate type manager; and an address editing manager for managing the editing of address types in accordance with the address type, wherein the one or more type managers and the general type manager are dynamic link libraries.

* * * * *